W. Johnson,
Animal Tether.
N°. 67,057.  Patented July 23, 1867.
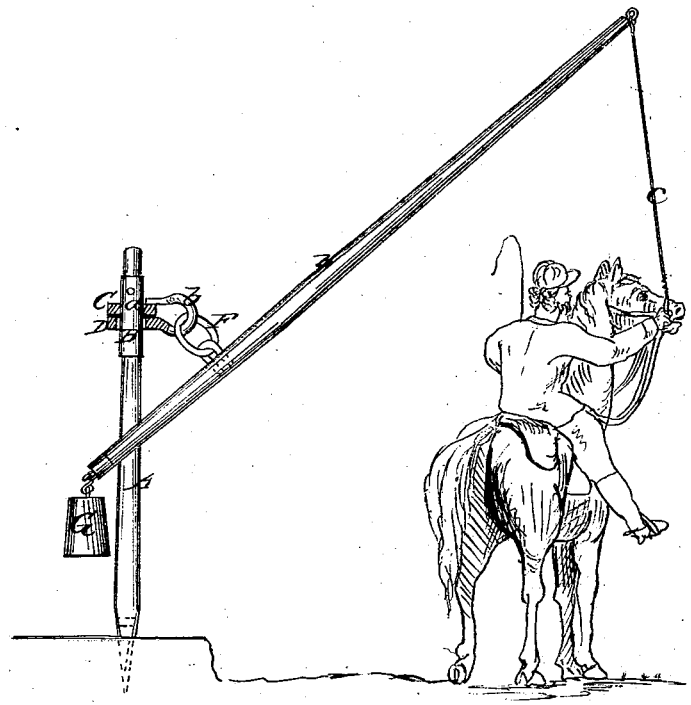
Witnesses
Theo Tusche
J. A. Servree
Inventor
W. Johnson
Per Munn & Co
Attorneys

United States Patent Office.

WARREN JOHNSON, OF FISHERVILLE, NEW HAMPSHIRE.

Letters Patent No. 67,057, dated July 23, 1867.

IMPROVEMENT IN DEVICE FOR TETHERING ANIMALS.

*The Schedule referred to in these Letters Patent and making part of the same.*

TO ALL WHOM IT MAY CONCERN:

Be it known that I, WARREN JOHNSON, of Fisherville, in the county of Merrimack, and State of New Hampshire, have invented a new and improved Device for Tethering Animals; and that the following description, taken in connection with the accompanying drawing, hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

This invention relates to a new and improved device for tethering animals, and is an improvement on that class of tethers which are composed of a weighted pole connected by a swivel to an upright or stake. The invention consists in an improved swivel, by which the pole is connected to the upright or stake, as hereinafter set forth. The accompanying drawing represents an elevation of my invention partly in section.

A represents an upright or a stake, which is firmly driven in the ground, and has an iron tube, B, fitted on its upper end and is secured in position by rivets or bolts $a$. This tube B has a collar, C, attached firmly to it, and if the tube and collar are of cast iron they may both be cast in one piece. D is a collar which is fitted loosely on the lower part of the tube B, underneath the fixed collar C, and is allowed to turn freely thereon, said collar D having a hook projection, $b$, which extends upward and has its end resting or bearing upon the upper surface of the fixed collar C. E is a pole having a ring, F, attached near one end, and which is fitted on the hook $b$. The end of the pole nearest the ring F has a weight, G, attached, which is sufficiently heavy to keep the long or unweighted end of the pole elevated, and to this end the horse or other animal to be tethered is secured by a suitable halter or rope, $c$. This swivel device is extremely simple and efficient, and may be constructed by any ordinary blacksmith, at a very moderate cost. It also works freely, or with but little friction, and is extremely strong and durable.

The pole E operates precisely the same as other tethers of the same class, the horse or other animal which is attached to it pulling it down as he walks outward in grazing, and the weight G elevating it as the animal approaches the upright or stake, the hole in consequence of the swivel connection being allowed to turn around on the stake.

I do not claim the pole E with weight G attached, for that has been previously used for tethering animals, but I claim as new, and desire to secure by Letters Patent- The swivel for connecting the pole E to the upright or stake A, the same consisting of a tube, B, with a collar, C, permanently attached and secured on the upright or stake, and a collar, D, fitted loosely on the tube and provided with a hook projection to bear or rest upon the fixed collar C, substantially as shown and described.

WARREN JOHNSON.

Witnesses:
ALVA P. BEEKMAN,
HENRY D. WHITE.